United States Patent [19]
Bogart et al.

[11] Patent Number: 4,749,540
[45] Date of Patent: Jun. 7, 1988

[54] DEMOUNTABLE TOKAMAK FUSION CORE

[76] Inventors: S. Locke Bogart, 2612 Galicia Way, Carlsbad, Calif. 92008; Leif Blumenau, 13 The Mint, Wallingford, Oxon, United Kingdom, OX100X-8

[21] Appl. No.: 940,240

[22] Filed: Dec. 9, 1986

Related U.S. Application Data

[63] Continuation of Ser. No. 550,926, Nov. 10, 1983, abandoned.

[51] Int. Cl.$^4$ .............................................. G21B 1/00
[52] U.S. Cl. ..................... 376/133; 376/142; 376/146
[58] Field of Search ............... 376/121, 133, 142, 146, 376/150, 296, 302

[56] References Cited

U.S. PATENT DOCUMENTS

| | | | |
|---|---|---|---|
| 3,486,978 | 12/1969 | Lacriox et al. | 376/296 |
| 3,568,384 | 3/1971 | Cruset et al. | 376/296 |
| 3,755,078 | 8/1973 | Stelle | 376/302 |
| 4,268,353 | 5/1981 | Powell et al. | 376/142 |
| 4,367,193 | 1/1983 | Bussard | 376/133 |

OTHER PUBLICATIONS

Yu et al., "Noel—A No Leak Fusion Reactor Blanket Concept," IEEE, 1977.
Sestero, "Omitron: An Ohmic-Ignition Tokamak Experiment," ENEA, 82.60/p, Dec. 1982.
Jassby et al., "FED-R-A Fusion Engineering Device Utilizing Resistive Magnets", FEDC, ORNL/FED-C-82/1, Apr. 1983.

Primary Examiner—Deborah L. Kyle
Assistant Examiner—Richard L. Klein
Attorney, Agent, or Firm—Jackson & Jones

[57] ABSTRACT

A demountable tokamak fusion reactor core in which a demountable central portion contains at least the inner toroidal field producing legs of the tokamak toroidal field coil and the plasma containment vessel. Also in the demountable central portion may be poloidal field coils and a means of heating the plasma or heating and shaping the plasma, e.g., an ohmic heating coil. The outer relatively permanent portion of the fusion reactor contains a blanket system within an opening formed by the current return legs of the toroidal field coil. Different embodiments of the ohmic heating coil could include a bucking cylinder toroidal magnet support. A reactor vessel and a dynamic tokamak support and tension suppressing system supports the tokamak.

26 Claims, 4 Drawing Sheets

DEMOUNTABLE TOKAMAK FUSION CORE

FIELD OF THE INVENTION

The present invention relates to a configuration and structure primarily for a commercial embodiment of a tokamak fusion reactor but also for a tokamak ignition/burn test reactor.

This is a continuation of application Ser. No. 550,926, filed Nov. 10, 1983 now abandoned.

BACKGROUND AND SUMMARY OF THE INVENTION

The potential use of controlled fusion for the commercial production of energy and/or energy products is a field in which a vast amount of research and development work, involving the expenditure of huge sums of money, is presently underway. A number of plasma confinement schemes are under study, of which toroidal confinement systems are proposed, and have been tested, and tokamaks are examples of toroidal confinement systems.

The tokamak fusion concept confines a plasma by the application of a toroidal magnetic field created by the toroidal magnet and a poloidal magnetic field created by the introduction of a large plasma current around the torus. This plasma current is basically produced by an induced electromotive force, emf, provided by poloidal field coil turns of which a central solenoidal ohmic heating field coil is the dominant coil. The effect is basically that of a transformer with the ohmic field coil operating as the primary and the plasma operating as a single turn secondary. In addition to contributing to plasma confinement, the poloidal field coil set also provides plasma heating through resistive absorption in the plasma as well as stability against horizontal and vertical displacements of the plasma. Tokamak plasma currents also may be provided by the application of radio-frequency power to the plasma, an effect that contributes to confinement, heating and, perhaps, steady state tokamak operation.

Tokamaks, as is true of any of the proposed fusion plant reactor embodiments, must not only be able to achieve and maintain acceptable plasma confinement conditions to enable the controlled fusion reaction, but also must meet criteria for commercial acceptability. These criteria for commercial acceptability involve many highly interrelated factors, including not only the power density available within the plasma when the machine is operating, but also such factors as recirculating power fraction (i.e, the amount of power necessary to drive the system to ignition and to maintain the necessary plasma confinement for burn), and the operating performance of the fusion reactor.

Power Density

The commercial attractiveness of power generating technology is strongly affected by the amount of power per unit volume (or, equivalently, unit mass) produced by the technology. This is a result of the fact that power generating devices are costly and high power densities are generally sought to extract the most amount of power from a device at a given cost. This objective is more important for fusion power concepts since they are expected to be costly to construct in terms of unit volume or mass.

The fusion power density of fusion reactors depends on two critical parameters, beta and the magnetic field density in the plasma. Beta is a plasma property that expresses the efficiency with which the plasma is confined by a magnetic field. It is defined as the ratio of the plasma pressure to the magnetic pressure (or equivalently, the ratio of the respective energies) and heretofore has been an experimental result rather than a value that can be readily controlled. However, there is new evidence that proper plasma shaping by imposed magnetic fields (for tokamaks and other confinement concepts) can enhance beta values. The magnitude of the magnetic field in the plasma is even more important to enhancing the fusion power density and this parameter is readily controllable to the technical limits of magnetic conductors and structures. The functional relationship between fusion power density, beta and magnetic field is density proportional to $(\text{beta})^2 (\text{magnetic field})^4$ so it is evident that low values of beta can be compensated by adjusting the magnetic field upwards.

Recirculating Power

Recirculating power, or the power that must be taken from the gross power of the plant to operate the fusion plant systems, is associated with all fusion concepts to a lesser or greater degree. It is generally agreed that fusion concepts based on superconducting magnetic confinement will have lower recirculating power requirements than fusion concepts utilizing normally conducting magnets. However, even for "ignited" superconducting confinement concepts, there may be large power requirements associated with achieving ignition and maintaining the required plasma conditions for burn. The recirculating power associated with fusion concepts employing normal conductors results from resistive losses in the magnets as well as those connected with plasma ignition and burn requirements. Consequently, it is generally thought that normally conducting magnetic fusion approaches may result in unacceptably high recirculating power requirements. However, this is not necessarily the case for several reasons. First, the electrical power gain of such systems is roughly $(\text{Beta times Magnetic Field})^2$ which may be sufficiently high to result in a quite acceptable recirculating power fraction albeit at higher levels of either beta and/or magnetic field. Second, it appears likely that normally conducting fusion concepts will be less costly to embody than superconducting concepts, thus resulting in comparable plant economics. Since plant economics is the ultimate determinant of commercial attractiveness, it is not clear whether recirculating power is more or less important than the plant capital costs which are expected to be higher for superconducting fusion concepts.

Operating Performance

The operating performance of fusion reactors in general and tokamaks in particular is dictated by several factors, the principal one being fusion neutron irradiation of components directly exposed to neutron irradiation from the plasma. Fusion power generation involves neutron irradiation of the components of the fusion core which is much more significant to the operating life of a fusion core than, for example, the core of a nuclear fission reactor. Long exposure to high neutron flux levels degrades the properties of the materials resulting in, for example, loss of strength or toughness, and components which have been subjected to such radiation must be preiodically replaced. In addition to fusion neutron irradiation, the components of a tokamak fusion core also may experience periodic thermal and mechanical stresses due to the cyclic operation of the device. These effects are destructively synergistic with neutron irradiation, thus implying a fairly short operating life of such components. In all superconducting fusion concepts and in most normally conducting fusion concepts, the irradiated components of the core include a blanket and a shield positioned or sandwiched between the plasma containment vessel and the surrounding confinement magnets. For the case of tokamaks and other toroidal fusion systems, the necessity for removable internal blanket and shield systems creates extremely difficult procedures for the periodic replacement of such systems when they reach the end of their useful lifetime. These difficulties are manifested in higher operating costs and longer plant outages which may lead to unattractive economic performance.

To date the literature on conceptual commercially viable tokamak power plants has been dominated by fusion reactors of the type employing superconducting magnets to provide the required magnetic fields for plasma confinement. Early studies, e.g., UWMAK-I (see "UWMAK-I, Wisconsin Tokamak Reactor Design," B. Badger, et al., UWFDM-68, March 1974) and PRD (see "A Fusion Power Plant," R. G. Mills, ed., MATT-1050, August 1974), produced very large reactors which were dominated by the toroidal field coils and, to some extent, by the blanket structure contained within. Later studies, such as NUMAK (see "NUMAK, A Tokamak Design Study," B. Badger, et al., UWFDM-330, March 1979), and STARFIRE (see "STARFIRE—A Commercial Tokamak Fusion Power Plant Study," C. C. Baker, et al., ANL/FPP-80-1, September 1980) resulted in considerably smaller reactors but still had the dimensions on the order of tens of meters. These large sizes, while to a certain extent a function of the geometric criteria for plasma performance, were and are necessitated by the amount of blanket and shield material which must be interposed between the plasma and the superconducting coils. The blanket serves to recover fusion neutron power as well as to generate the requisite fusion fuel, tritium. The additional shielding serves both to reduce the nuclear heating in the superconductor to manageable levels and to limit radiation damage to levels allowing thirty to forty year magnet lifetime. The amount of blanket and shielding required between the plasma chamber and the inner toroidal coil leg reduces the magnetic field in the plasma for a maximum allowable field at the conductor as dictated by the properties of superconductors. For today's superconductor technology, this constraint results in maximum plasma magnetic fields ranging between five to seven tesla. In addition the blanket surrounding the plasma containment vessel also limits the minimum value of the aspect ratio of the tokamak, which is the major radius of the tokamak from the vertical axis of the toroidal field coils to the center line axis of the plasma, divided by one-half of the width of the plasma along that major radius. The effect of a larger aspect ratio, imposed by the necessity to provide a blanket and shield on the inner part of the tokamak, is thought to have an adverse effect on the plasma performance parameter, beta. These factors, among others, contribute to fixing the minimum reactor core size and the maximum magnetic field strength and beta in the plasma, thereby limiting the fusion power density. Thus, the relatively low fusion power density in a superconducting tokamak may prove to result in unacceptable economic performance in comparison with other means of producing electrical power.

Improvements in superconductor technology and increases in beta limits which result in improved plasma performance will tend to alleviate the reduced economic performance in terms of greater power production for a given geometry; however, this will exacerbate the problems created by neutron dose limits on the first wall and blanket which will necessitate more frequent replacement. Hence, improvements in superconducting tokamak plasma performance may not necessarily result in better reactor performance because of the adverse effects on reactor operation due to more frequent blanket and shield replacement. See "End Product Economics and Fusion Research Program Priorities," L. M. Lidsky, TFG Inc., Mar. 25, 1982.

It is also known in the art to employ normal as opposed to superconducting magnetic technology for plasma confinement. Throughout the world, most of the experimental machines constructed to date have employed normally conducting magnets because of their relatively low cost and the familiarity with the engineering of this technology. In the United States today, the major normally conducting tokamaks include the Tokamak Fusion Test Reactor (TFTR), the Poloidal Diverter Experiment (PDX), the Princeton Large Torus (PLT), the ALCATOR-C, and the Doublet III. These machines are subignition plasma physics experiments having no need for internal blankets and shields. Proposed tokamak ignition experiments include the IGNITOR (see "IGNITOR" (5 volumes), Scuola Normale Superiore, Comitato Nazional Energia Nucleare, Consiglio Nationale delle Richerche, CNEC, Contract No. 40109, May 1981), the LITE (see "A Long-Pulse Ignited Test Experiment (LITE) - An Alternative for TFTR Upgrage, L. Bromber, et al. (MIT) and D. L. Jasaby (PPPL) DOE/ET-51013-48, June 1982; "A Long-Pulse Ignited Test Experiment (LITE), L. Bromberg, et al., Fifth Topical Meeting on the Technology of Fusion Energy, Knoxville, April 1983), the Tokamak Fusion Core Demonstration (TFCD) (see "Long-Pulse Ignited Test Experiment (LITE) Design for TFCD," L. Bromberg, et al., presentation sheets (MIT), July 1983; Briefing Package for the June 1983 Meeting of the DOE Energy Research Advisory Board, Princeton Plasma Physics Laboratory, June 1983), and the RIGGATRON ™. Other non-tokamak normally conducting toroidal devices include two varieties of reverse field pinches; the Ohmically Heated Toroidal Experiment (OHTE) and the ZT-40. Among the above, conceptual studies of fusion reactor embodiments have been performed for the RIGGATRON ™ tokamak (see "RIGGATRON ™ Fusion Power Plant Design Studies," INESCO 1983), the reversed field pinch (OHTE) (see "OHTE Reactor Concepts," R. E. Bourque, Proceedings of the 9th Symposium on Energy Problems of Fusion Research, II, 1851, October 1981; "The OHTE Reactor Concept," T. Tamano, Nuclear Technology/Fusion, Vol. 3, No. 1, January 1983), and the Compact Reversed Field Pinch Reactor—CRFPR (see "Compact Reversed-Field Pinch Reactors (CRFPR): Sensitivity Study and Design-Point Determination,: R. L. Hagenson, et al., LA-9389-MS, July 1982), and a large version of a LITE type tokamak (AFTR2) (see "Tokamaks with High Performance Resistive Magnets: Advanced Test Reactors and Prospects for Commercial Applications," L. Bromberg, et al., DOE/ET/51013-24 (MIT), October 1981).

Normally conducting magnetic fusion confinement devices in general and tokamaks in particular differ in important ways from superconducting devices. First, normal conductors can achieve much higher magnetic fields because they are not limited by the same physical factors that govern the behavior of superconductors. Second, they may operate at temperatures at and above ambient levels, thus eliminating the absolute requirement for shielding from nuclear radiation. By the same token, large, complex and expensive cryogenic refrigeration systems also are not needed. Lastly, but to the detriment of normal conductors, they require much larger amounts of power to energize them in comparison with superconductors.

The IGNITOR (a liquid nitrogen cooled magnet), the LITE (a water or liquid nitrogen cooled magnet) and the TFCD (presently unspecified coolant technology) represent experimental fusion reactor cores which are related to the present invention in that the plasma physics results obtained from these machines would become a basis for the plasma ignition and burn properties for a demountable tokamak fusion core according to the present invention. The present invention is not related to the specifics of the plasma physics, confinement geometry and confinement scheme (except broadly speaking); however the utilization of the structure for the demountable tokamak fusion core according to the present invention will result in the lowering of the criticality of a number of system constraints including those referred above, which have hitherto prevented the design of an acceptable commercial fusion reactor capable of production of useable fusion energy and also have detracted from the design of experimental ignition and burn fusion cores.

The AFTR2 tokamak and the OHTE and CRFPR reversed field pinch reactor concepts all employ a blanket and shield interposed between the entire fusion plasma and the surrounding normally conducting confinement magnets. The choice of blanket and shield location is dictated by tritium breeding, magnet radiation damage and reactor plant efficiency for these concepts. Among these concepts, the OHTE and the CRFPR have been viewed as replaceable at the end of their service life of about one year. However, the OHTE and the CRFPR differ from the reactor embodiment subject of the present application in that the plasma physics is entirely different, the plasma is completely contained within a surrounding blanket and shield assembly, and the entire fusion core is replaced at the end of its service life. The cost of the fusion core and its replacement frequency could well result in unattractive plant economic performance.

The RIGGATRON ™ design is disclosed in U.S. Pat. No. 4,367,193 to Bussard entitled "Modular Fusion Apparatus Using Disposable Core," and is summarized in an appendix to G. Miley, "Economic Comparison of Large and Small Fusion Reactor Concepts," University of Illinois FSL-99 (1982). Disclosed in that patent is a completely self-contained tokamak that would be placed totally within a blanket/shield containing vessel and operated for a given service life, and thereupon replaced by a fresh tokamak unit. This geometry introduces a number of problems that will affect its viability to evolve into a commercially acceptable fusion reactor. These include the fact that the blanket will be exposed to a neutron flux with a much degraded energy spectrum resulting in less of the power of the fusion reaction being converted through the blanket system to useable electric energy. Moreover, the neutron flux density in the blanket, wherein tritium fuel is also produced as a subfunction of the blanketing system, creates additional problems. In order to breed sufficient tritium to sustain the fuel cycle and at the same time maintain a thin enough toroidal coil outer conductor thickness to reduce the absorption of fusion neutron power within those outer coils (in accordance with the parameters of maintaining the coil material relatively cool in order to avoid unacceptably high electric power losses and additionally resulting in low thermal conversion efficiency), the electrical power required to operate the toroidal field coil must be increased. The net result is that the recirculating power for a pure fusion RIGGATRON ™ can be expected to be high, resulting in questionable pure fusion plant economics.

There has also been proposed a tokamak design for physics and materials testing and also perhaps ultimately a tokamak demonstration reactor. This concept, the FED-R, would have joints in the toroidal field coils in order to remove the outer current return legs, leaving the field producing legs, blanket, plasma vessel, poloidal coils and ohmic heating coil relatively permanent components. See "FED-R—A Fusion Engineering Device Utilizing Resistive Magnets," D. L. Jassby, S. S. Kalsi eds., FEDC, ORNL/FEDC-82/1 (1983). The outer portion of the toroidal field coils is proposed to be removed first, followed by maintenance and/or replacement of components in the central portion. This design presents various problems for commercial reactor applications, because, e.g., the vessel support system would have to be disassembled or displaced to remove the outer legs from around the blanket and plasma. Also, leaving the highly radiated plasma vessel, blanket and inner legs, and removing the outer legs presents several radiation control problems during maintenance/replacement.

The problems enumerated in the foregoing are not intended to be exhaustive, but rather are among many which tend to impair the effectiveness of previously known designs for the configuration and structure of a fusion reactor core, and particularly of the tokamak variety. Other noteworthy problems may also exist; however, those presented above should be sufficient to demonstrate that prior fusion reactor core designs appearing in the art have not been altogether satisfactory and may not lead to the production of electric power from a commercially acceptable fusion reactor.

It is, therefore, a general object of the invention to provide a novel configuration and structure for a fusion reactor core of the tokamak variety which elminates or minimizes the problems of the type previously noted.

It is therefore, a feature of the present invention to place the blanket system interior to the tokamak toroidal field coils, but not surrounding as well the plasma. This eliminates the potential degradation of the tritium breeding ratio within the blanket due to neutron absorption in the outer toroidal field return current coil legs (with the concomitant problems of such neutron absorption in that portion of the tokamak toroidal field coils) and allows maximization of the dimensions of the toroidal field return current coil legs based upon electrical and mechanical performance parameters only. In addition, the positioning of the blanket avoids the deleterious effects on, e.g., aspect ratio, over systems where the blanket and shielding surrounds the entire plasma.

Finally, positioning the blanket within the toroidal field coils facilitates enhanced electric power production, thus reducing the recirculating power and increasing the economic attractiveness of the invention for commercial fusion electric power generation.

It is a further feature of the present invention to provide a demountable and replaceable internal portion of the tokamak fusion core which comprises the inner toroidal field producing legs of the toroidal field coil windings and the plasma containment vessel, as well as, possibly, other tokamak components employed for plasma shaping, e.g., poloidal field coils, and for obtaining ignition in the plasma, e.g., an ohmic heating coil. The connection between the demountable inner portion and the relatively permanent outer portion of the toroidal field coil is achieved with joints, examples of which appear in the literature. See "Demountable Externally Anchored Low Stress Magnet System and Related Method;" James Powell, et al., U.S. Pat. No. 4,268,353, May 9, 1981; "FED-R—A Fusion Engineering Device Utilizing Resistive Magnets," D. L. Jassby et al. eds., ORNL/FEDC-821; April 1983. The joints which have been selected for this application may be, for example, of an interference fit tongue-andgroove configuration.

It is a further feature of the present invention that the replaceable fusion power core is constrained in size to be on the order of 5.0–7.0 meters in diameter, which will facilitate transportation of replacement units for the demountable portion of the core by rail or barge to reactor sites remote from the location of fabrication of the demountable core as a single unit. This size will also ease the handling of spent removable central portion units removed from the fusion reactor at an estimated frequency of approximately two to four months. This feature is permitted because of the reduction of the size of the necessary remote maintenance equipment to lift the spent unit from the reactor, and place it in a shielded environment in a fashion somewhat similar to the present handling of removed spent fission reactor cores.

It is a further feature of the present invention that the demountable central portion of the fusion core contains only the inner field producing legs of the toroidal coils and the plasma containment vessel, along with, possibly, other associated equipment positioned radially inward of the surface separating the demountable central portion and the semipermanent outer portion of the reactor. In particular, poloidal field coils for plasma shaping are envisaged to remain in the bore of the TF coil, preferably in the demountable central portion, to enhance field/plasma coupling and to reduce (possibly eliminate) overturning moments on the TF coil turns. This allows for a larger plasma major radius and greater plasma elongation within the confines of the same aspect ratio in comparison with, e.g., a RIGGATRON TM in which the entire toroid is to be removed and replaced. Also contained in the demountable central portion may be a means for obtaining ignition in the plasma, e.g., an ohmic heating coil or rf heating antennae. Thus the presesnt invention allows for significant improvement in the overall performance of a normally conducting tokamak fusion reactor, while at the same time the relatively frequently replaceable portion is of a size lending itself to industrial fabrication at a separate facility and transportation by rail or barge to the reactor site.

It is a further feature of the present invention to provide an external structural system comprising a U-shaped solid of revolution with a lid interposed at the open end to serve as a tension suppression system for containing therein all of the tokamak assembly and to react magnetic pressure deriving from the TF coil, thus keeping it at a safe stress condition. Examples of proposed fusion reactor vessel systems having some form of tension suppression system appear in the literature, e.g., "OMITRON: An Ohmic-Ignition Tokamak Experiment," A. Sestero, 82.601p, December 1982. The confinement system will also act as a biological shield and counteract the effects of any overturning moment. In addition, because of the tension suppression, in conjunction with other features of the present invention, lower aspect ratios will be possible which is expected to contribute to higher plasma power density with the improved geometry of the tokamak of the present invention.

Examples of the more important features of the present invention thus have been summarized rather broadly in order that the detailed description thereof that follows may be better understood and in order that the contribution to the art may be better appreciated. There are, of course, additional features of the invention which will be described hereinafter and which will also form the subject of the appended claims. These other features and advantages of the present invention will become apparent with reference to the following detailed description of a preferred embodiment thereof in connection with the accompanying drawings, wherein like reference numerals have been applied to like elements, in which:

DETAILED DESCRIPTION OF A PREFERRED EMBODIMENT OF THE INVENTION

Figure 1:
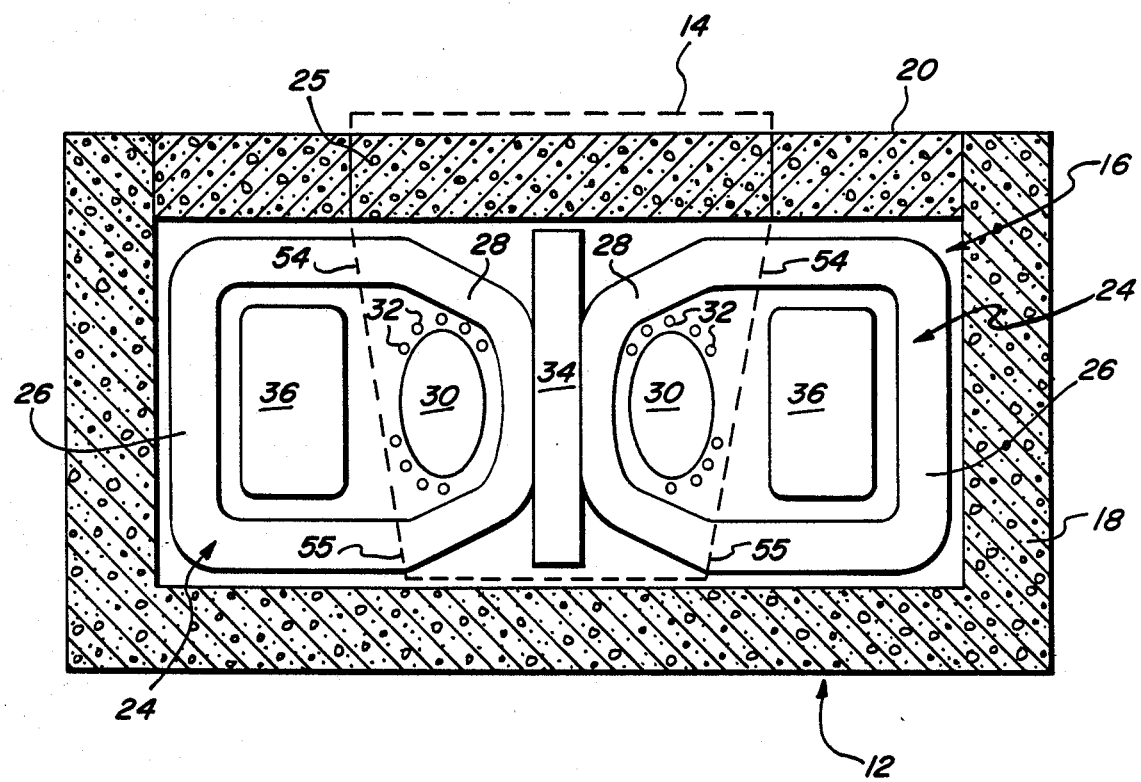
FIG. 1 shows a generally schematic cross-sectional view of the tokamak fusion reactor core within its confinement vessel, illustrating the location of the major components of the tokamak fusion reactor core positioned within the vessel, and the demountable central portion of the tokamak fusion core.

Turning now to FIG. 1, there is shown a fusion nuclear reactor core designated generally as 12 based on the tokamak principle and which employs a water cooled, normally conducting toroidal field coil 24. The tokamak toroidal field coil 24 and associated systems shown generally schematically in FIG. 1 are contained within a confinement vessel 18 forming a generally U-shaped solid of revolution. The vessel has a removable lid 20 which, as shown in FIG. 1, also has a removable central portion 25 of generally cylindrical shape.

The tokamak fusion core 12 has a demountable and removable central portion contained within dotted line 14 and a relatively permanent outer portion generally indicated as 16. The tokamak has toroidal field coil turns 24, of which there are approximately 120 in number. The number of turns is a function of power supply cost characteristics and the limitation of coil turn current to less than about 500,000 amperes. The toroidal field coil turns 24 are segmented into a relatively permanent outer portion 26 of the legs of the coil turns, which serve to carry the return current to the inner field producing legs 28, which are here shown as contained within the demountable central portion 14. The demountable central portion 14 also includes the plasma containment vessel 30, a plurality of plasma shaping poloidal field coils 32 surrounding the plasma containment vessel 30 and an ohmic heating coil 34 positioned internal to the toroidal coil windings 24 and along the central axis of the torus formed by the toroidal field coil 24. It will be understood the preferred design shown in FIGS. 1 and 2 could be modified, e.g., to place some or all of the poloidal field coils 32 and auxiliary plasma maintenance equipment (such as fueling, heating, impurity control, current drive, etc.) outside of the demountable central portion 14.

Associated equipment relating to the operation of the plasma containment vessel 30, poloidal field coils 32 and ohmic heating coil 34 is also contained within the demountable central portion 14 and will be described in more detail with respect to FIG. 2.

Contained within the generally permanent outer portion 16 of the toroidal coil 24 is a main blanket system 36 which is also toroidal in shape, but possibly segmented. However, the main blanket 36 does not extend into the demountable central portion 14, and does not serve to shield the demountable central portion 14 field producing coil legs 28 from the fusion reaction occurring in the plasma containment vessel 30.

It will be seen schematically in FIG. 1 (somewhat exaggerated for illustrative purposes) that joints 54, 55 between the inner toroidal field producing legs 28 and the outer current carrying legs 26 are positioned and constructed such that the maximum diameter of the demountable removable central portion 14 at the upper joint 54, as shown in FIG. 1, is greater than the maximum diameter of the lower joint 55. This is in order that the entire central portion unit 14 may be removed along with the removable portion 25 of the lid 20 (or the entire lid 20 in the embodiment of FIG. 2). This will be done at the end of the service life of the demountable central portion 14 which is estimated to be on the order of two to four months. The service life of the main blanket system 36 and the relatively permanent outer portion 16 of the toroidal field coil is also dictated by accumulated fusion radiation damage, but will, however, be on the order of approximately 1–5 years for the main blanket 36 and 10–20 years for the current return legs 26 of the toroidal field producing coil turns 24. At the end of the operational lifetime either the main blanket 36 will then be replaced, as explained more fully respecting FIG. 2, or the main blanket and outer coil leg portions 26 will be replaced, following removal of the entire lid 20 as well as the then spent demountable core 14 from the fusion reactor 12.

Figure 2:
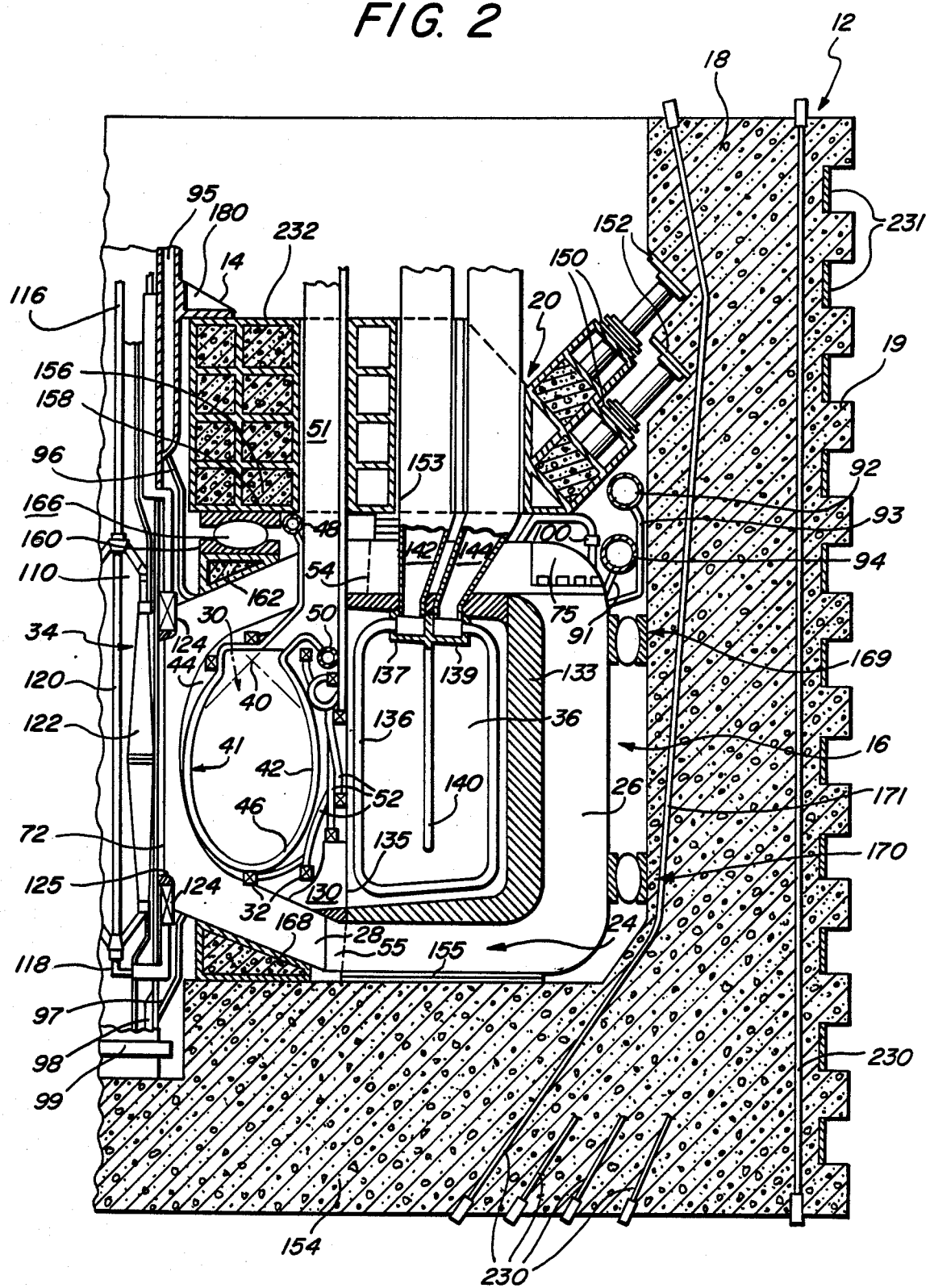
FIG. 2 is a side elevational view of a cross-section of the tokamak fusion reactor core half extending radially outward from the axis of symmetry of the tokamak and illustrating in more detail than FIG. 1 the components of the fusion reactor core and its subsystems and the confinement and tension suppression systems according to the present invention, as well as an alternative lid construction to that illustrated schematically in FIG. 1.

Turning now to FIG. 2 there is shown a cross-sectional side elevational view of one-half of the fusion reactor 12 of the present invention. FIG. 2 illustrates an alternative embodiment for the lid 20, which is likely more easy to construct and support. In this embodiment, there is no demountable central lid portion 25 but rather the lid 20 is a single unit. The lid 20 and demountable central portion 14 in this embodiment are lifted out as a unit from the fusion reactor core 12.

Contained within the demountable central portion 14 is the plasma system associated with the plasma confinement vessel 30 nested inside of the demountable central portion 14 toroidal field producing legs 28. The plasma containment vessel 30 is designed to contain an eliptically shaped plasma with an elongation of approximately 1.6, although a bean shaped plasma may be employed in practice if superior performance of such bean shaped plasmas is demonstrated. Provision is made for a single null diverter indicated by the separatix 40 shown in phantom in FIG. 2. As is known in the art, null diverters facilitate removal of impurities from the plasma. However, other impurity removal techniques such as pumped limitors may be employed equally as well. The plasma confinement vessel 30 is formed by the so-called first wall system 41, which comprises a sandwich construction consisting of a conducting wall 42 on the plasma side, made from strong and relatively conductive high temperature metal, e.g., CuNi alloy, and the structural outer wall 44 on the magnet side, made from resistive high temperature material such as IN 718. Between the conducting wall 42 and the structural wall 44 are coolant channels 46 through which heavy water coolant is pumped from a inlet header 48 to an outlet header 50. The headers 48 and 50 run circumferentially about the axis of revolution of the tokamak and are electrically segmented circumferentially to avoid the production of eddy current fields. Coolant is pumped at a high velocity of approximately 25 meters per second through the coolant channels 46. The conducting wall 42 and structural wall 44 are joined together by a matrix of internal ligaments/stringers (not shown) which serve as a surface area enhancement for cooling of the conductive wall 42 and as a structural tie between the inner conductive wall 42 and the outer structural wall 44, thus forming a sandwich type structure.

The plasma facing surface of the inner conducting wall 42 is coated with high temperature performance materials (not shown) such as titanium impregnated graphite tiles fixed to the plasma facing surface of the inner conducting wall 42 by brazing or other means. This provides a durable surface for plasma-first wall interactions and minimizes plasma impurities produced by, for example, blistering or sputtering. It will be seen that the coolant in the channels 46 first passes through the high heat flux area of the inner and outer diverter target surfaces adjacent the separatrix 40.

Figure 3:
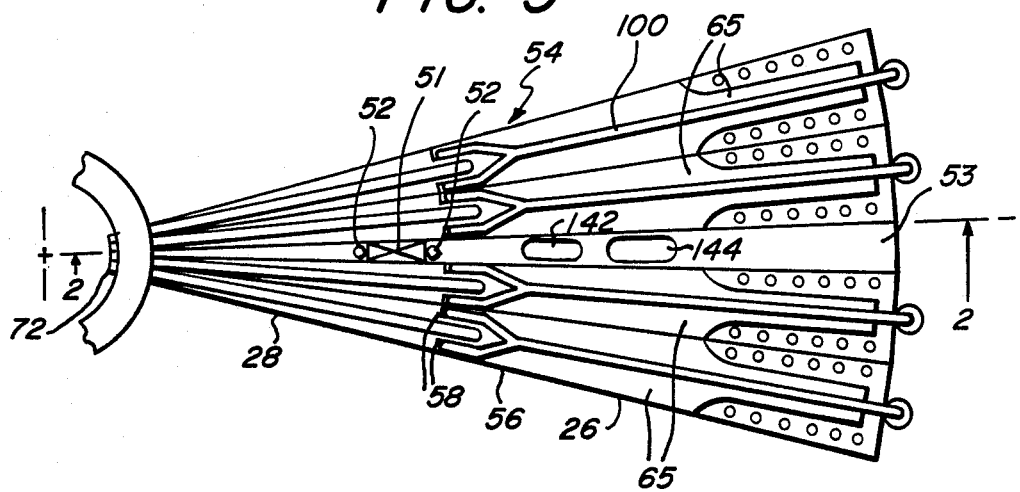
FIG. 3 is a plan view of several turns of the tokamak toroidal field coil windings illustrating generally the shape of the toroidal field coil winding turns and the joint between the inner (central) removable portion of the tokamak toroidal field coils, containing the field producing legs, and the outer relatively permanent portion of the toroidal field coil, containing the current return legs. Also illustrated is a dummy turn inserted between two of the turns for purposes of providing access ports for such things as plasma containment chamber evacuation and the like. Also illustrated is the joint provided at the intersection of the outer top and outer vertical sections of the toroidal field coil to permit removal of the outer top section for periodic blanket replacement.

A vacuum duct 51 is of a trapezoidal plan view cross-sectional shape in order to pass through an opening in one of a plurality of dummy turns, as shown in more detail in FIG. 3. The vacuum duct 51 extends through the lid 20 to an external means (not shown) for drawing a vacuum in the plasma containment vessel 30. The coolant inlet header 48 has a coolant supply line (not shown) which also passes through such a opening in a dummy turn as does the coolant exit line (not shown) connected to the outlet header 50.

Surrounding the plasma containment vessel 30, and contained within the inner portion 14 of the fusion core 12, and also within the interior opening formed by the field producing legs 28, are positioned a plurality of poloidal field coils 32. These are each individually supplied with both electrical power and water coolant through combined coaxial power and coolant lines 52, each of which pass through an opening in one or more of the above-mentioned dummy turns, in the region of the dummy turns contained within the demountable inner portion 14.

The toroidal field coil 24 consists of the demountable inner magnetic field generating legs 28 and the surrounding relatively permanent outer current return legs 26. The inner and outer segments of the toroidal field coils, 28, 26 are radially offset, i.e., have an increasing taper from the bottom to the top as shown in a more exaggerated schematic fashion in FIG. 1. This facilitates removal of the inner demountable portion 14 of the fusion core 12 by a simple vertical lift means. It will be understood that designs are currently proposed for core removal and replacement with access from the bottom of the vessel. For such a design, of course, the lower joint would define the maximum outer diameter of the radially offset demountable inner portion 14. The upper joint 54 and lower joint 55 may be configured as a tongue and groove arrangement with a tapered lead-in as shown in more detail in FIGS. 4 and 5. It will be understood, however, that other suitably configured joints also may be utilized, including, joints which are remotely operated for detaching the inner toroidal magnetic field producing legs 28 from the outer current return legs 26.

Figure 4:
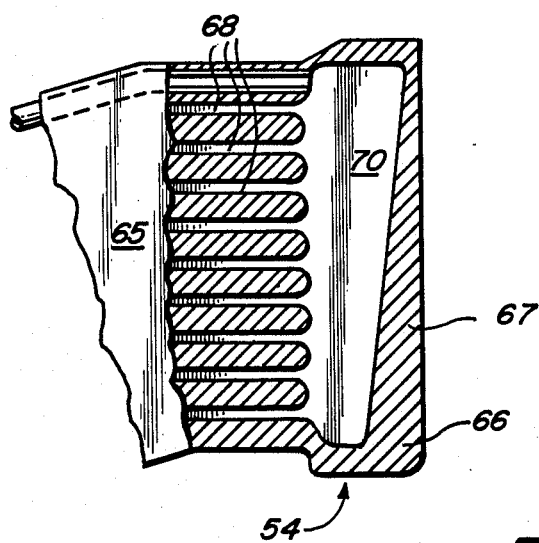
FIG. 4 shows a side elevational view, partially in cross-section, of the tongue and groove joint at the upper one of the joints between the inner and outer portions of the tokamak fusion core, illustrating also the internal cooling passageways and coolant plenum.
Figure 5:
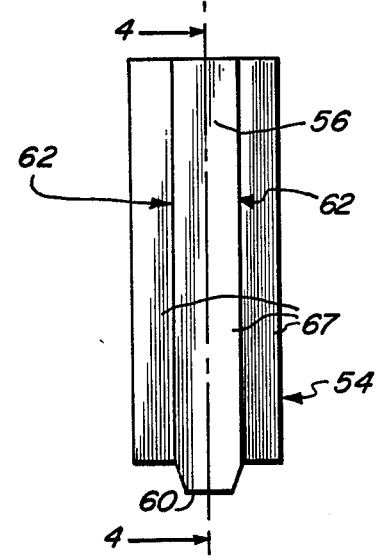
FIG. 5 shows a front elevational view of the tongue and groove joint shown in FIG. 4.

With the joints 54 and 55 as shown in FIGS. 4 and 5 (respecting joint 54), current transfer from the inner portions 28 to the outer portions 26 of the turns of the toroidal field coil 24 is primarily through the lateral surfaces, which have an area of approximately ten times the coil cross-section, and which are joined with an antigalling material such as silver or high purity aluminum. Clamping action between the tongue and groove portions of the joints 54 and 55 is affected by differential thermal expansion. In the placement or replacement of the central portion 14 the outer coil portion 26 is heated (to approximately annealing temperature), which also serves to restore material properties to pre-irradiation conditions after the outer portion has been in use and subjected to some radiation, and the inner coil portion 28 is cooled (to approximately the temperature of liquid nitrogen). The existing colling channels within the toroidal field coil portions 26 and 28 (as described in more detail below) are employed to pass the respective heating or cooling fluids through the coil portions 26 and 28 for this purpose. When the respective tongue and groove joints are made, the heating and cooling fluids/gases are removed and thermal expansion of the tongue and contraction of the groove result in a sufficiently tight fit for the joints 54, 55.

Turning now to FIGS. 3, 4 & 5 it will be seen that the inner 28 and outer 26 portions of each of the toroidal field coil turns 65 are fabricated with individual plates 67 (similar to that employed previously in the ALCATOR), with each turn 65 made up of a plurality of diffusion bonded plates 67 which have been grooved on one side for the purpose of forming the coolant channels 68 and have been penetrated to incorporate an internal coolant plenum 70 shown in FIG. 4. The conductor material selected for the inner and outer toroidal field coil sections 28, 26 is Cu—Cr—Zr alloy, e.g., modified Elbrodur made by Kabelmetal, with the exception of the highly stressed nose section 72 (FIG. 3), where a strip of less conductive but stronger material, e.g., modified CuBe 14 alloy by Berylco is bonded, for example, by EB-welding. Electrical insulation between the turns 65 is provided by detonation spray gun coating of alumina and anodized aluminum foils.

Figure 6:
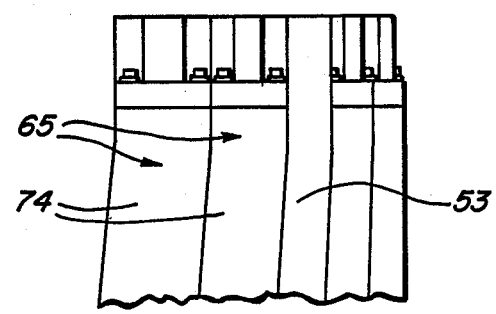
FIG. 6 shows a perspective view of portions of several of the current return legs of the outer portion of the tokamak fusion core coil turns illustrating the slanted vertical return leg, which provides for the helical shape of the toroidal field coil.

As is shown more fully in FIG. 6, the curent crossover between individual coil turn plates 65 is made at the vertically extending region of the outer portion current return coil legs 26 as indicated by the slant 74 in the leg plates 65 as shown in FIG. 6 (the slant is exaggerated somewhat for purposes of illustration). It will be understood, that the outer portion current return coil legs 26 also could be made of a material different from that selected for the inner portion field producing legs 28. This material would be selected more for its electrical performance, and is less critical in terms of strength and neutron irradiation damage resistance because the outer coil legs 26 bear less stress by virtue of the tension suppression system and, are shielded by, e.g., the main blanket 36.

Returning now to FIG. 2, it is seen that the inner coil legs 28 and outer coil legs 26 have independent cooling systems, necessitated by the demountability of the inner portion 14. Both systems in this embodiment are single pass. Each coil turn plate 65 of the toroidal field coil 24 is separately supplied with liquid coolant. The coil turn plates 65 of the outer portion 26 are supplied with a light water coolant via an inlet header 92 through a coolant feed tube 93 which is next to the header 92 and extends in a recessed channel at the external periphery of respective turn plate 65 to the lower joint 55, at which point the tube 93 connects to an inlet plenum at the joint 55 similar to the inlet plenum 70 shown in FIG. 4. The coolant then passes through the coolant channels similar to those shown at 68 in FIG. 4 from the joint 55 to an access joint 75 in the respective coil turn plates 65 of the outer portion 26. The access joint 75 and its function are described below. A demountable jumper line 100 connects to the outlet plenum of the respective turn plate 65 at the access joint 75 where the jumper line 100 then passes in a recessed channel across the upper horizontal stretch of the outer coil conducting leg section 26 of the respective turn plate 65 and enters an inlet plenum in the turn plate 65 adjacent the joint 54. The coolant water then passes through internal cooling channels 68 in the upper horizontal stretch and through the access joint 75 where a return line 91 is connected to a coolant plenum in the access joint 75 and to the outer portion cooling system outlet header 94.

The inner portion 28 cooling system has an inlet header 95 which is connected to a plurality of inner portion inlet tubes 96 each connected to a coil turn plate 65 of the inner portion 28 at an inlet plenum adjacent the joint 54. The coolant then passes through the internal coolant channels to an outlet plenum adjacent the joint 55 and into an outlet tube 97 which passes in a recessed channel in the external periphery of the lower generally horizontal stretch of the respective coil turn plates 65 of the inner portion 28 and exits through the tube 97 into an inner portion outlet header 98. The coolant passed through the inner portion 28 may be heavy water.

Positioned about the axis of symmetry of the toroidal field coil 24 is a central core containing an ohmic heating coil 34. The ohmic heating coil 34 is, for example, of the "Bitter" type which has a plurality of flat helical turns each formed from a helical disk (not shown) of generally flat material. The "Bitter" disks may be composed of a stronger, less electrically conductive material at the center part of the disk, where mechanical stresses are the highest, and a weaker but more electrically conductive material disposed in the radially outward part of the disk. The disks are constructed with internal coolant channels (not shown) which are in fluid connection with a coolant inlet plenum 120 at the central portion of the ohmic heating coil 34, with the coolant channels opening at the radially outward edge of the disks into a coolant exit plenum 122 within the central core containing the ohmic heating coil 34. Coolant is provided to and removed from the ohmic heating coil 34 from the top and the bottom of the inlet and outlet plenums 120, 122 in the demountable central assembly 14, thus resulting in a "split" flow arrangement. A remotely operated disconnect flange 99 connects the bottom of the ohmic heating coil 34 assembly to a mount attached to the base 154 of the vessel.

The ohmic heating coil 34 produces a magnetic field with a flux swing sufficiently large to induce a current in the plasma of such magnitude to ohmically heat the plasma for the ignition phase and drive the current during the burn phase of the tokamak operation. It is to be noted, however, that a feature of the present invention, which removes the blanket from the position surrounding the plasma confinement chamber 30 allows for a fatter plasma, i.e., plasma elongation factor. Plus, while the effectiveness of ohmic heating is reduced in some plasma geometries because of the reduction in resistivity with the increase in the plasma temperature, with a fatter plasma the plasma density tends to compensate. Thus the resistivity does decrease, as the plasma temperature rises, but, because of the fatter plasma, the effect is less drastic in impeding the use of ohmic heating to obtain ignition and burn.

Figure 7:
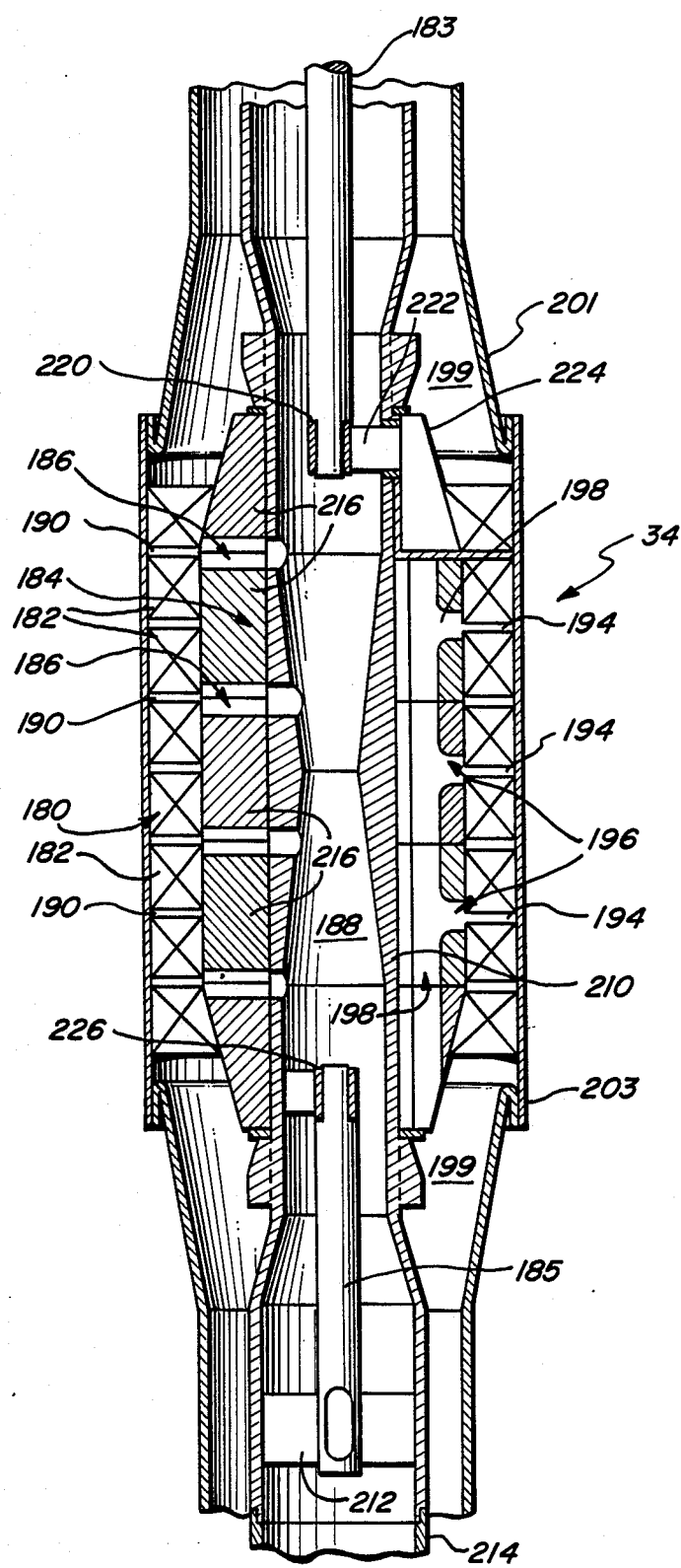
FIG. 7 shows an alternative embodiment of the ohmic heating coil illustrated in FIG. 2, which incorporates a bucking cylinder principle to co-act with the tension suppression system to relieve shear stress on the toroidal field coil by changing wedging action between the coil turns to a bucking action of each coil turn on the bucking cylinder formed by this embodiment of the ohmic heating coil.

Alternatively, the ohmic heating coil 34 may be of wound construction and also may serve as a bucking cylinder against the toroidal field coil turns 24. Such a configuration is shown in FIG. 7. The ohmic heating coil 34' shown in FIG. 7, which is a straight circular solenoid 180, is typically arranged as a series of reverse-wound ribbon windings 182, one on top of the other. Current traverses from one winding 182 to another by leads (not shown) which alternate on the inside and then on the outside, all the while rotated a fraction of the circumference to minimize the error field.

A mandrel 184 consists of a central hourglass-shaped cylinder 210 made from conductor material, e.g., Be-$Cu_{14}$ by Berylco and a number of cylindrical sections (five shown), 216 made from nonmagnetic structural material, e.g., Inconel or austenitic stainless steel A-286. The cylindrical sections 216 are stacked one on top of the other via a layer of electrical insulation and are fitted tightly around the central cylinder 210 also via a layer of electrical insulation.

Insulated internal electrical leads 211 of substantially trapezoidal cross-section, which connect winding sections 182, are laid into tight-fitting vertical slots in the cylindrical sections 216. Only the first of these leads 211 is actually shown since they are rotated relative to each other a fraction of the circumference. The slots into which the leads are fitted prevent circumferential eddy currents from being induced in the cylindrical sections 216.

The mandrel 184 serves several purposes. First, it aids the windings 182 in reacting the toroidal field coil 24 centering force, and thus, keeps the winding 182 at a safe stress level. Second, the mandrel 184 provides coolant passages 186 for the windings 182. Third, a portion of the mandrel 184, namely the central hourglass-shaped cylinder 210, returns the current concentrically within the ohmic heating coil 34' and thus serves as cancellation current to the axial vector of current passed through the windings 182 with adjoining external and internal current leads. Typically, coolant enters from both ends through a central bore 188 in the cylinder 210 of the mandrel 184. The radially oriented channels 186 carry the coolant to circumferential plenae 190 between every second ribbon winding 182. The coolant, still at high pressure, is forced through tiny channels (not shown) axially through the windings 182 on either side of a respective inlet plenum 190. Similar circumferential plenae 194 collect the coolant for distribution to radially oriented channels 196 which adjoin axially-oriented channels 198 in the mandrel 184 carrying the coolant out of the solenoid region through a pair of coolant outlets 199 at the top and bottom of the ohmic heating coil 34', and formed by an extension of each end of the cylinder 210, as an inner wall, and a casing 201, surrounding the ohmic heating coil 34', as an outer wall. The casing is formed of three parts surrounding respectively, the upper and lower outlet plenae 199 and windings 182, and joined by flexible joints 203.

A solid cylindrical current supply lead 183 enters the ohmic heating coil 34' within the bore 188, at one end thereof, from the top as shown in FIG. 7. The lead 183 is joined to a lateral current transfer lead 222 which penetrates the cylinder 210 and is insulated from it by insulation 224. The lateral lead 222 is further connected to a vertically oriented, approximately triangular in shape, electrical lead 211 which is internal to the first cylindrical section 216. This lead 211, in turn, is brazed to the first turn of the spiral winding 182. Similarly, a solid cylindrical lead 185 is connected to the last winding 182 of the bottom of the ohmic heating coil 34'. The opposite end of the lead 185 is connected to a current distribution plate 212 with fins which are electrically connected at their ends to the cylinder 210. An electric break 214 at the bottom of the cylinder 210 prevents current from flowing downwards and, thus, the current is returned upwards concentrically within the ohmic heating coil and eventually forms a coaxial arrangement with the inlet lead 183. The convention of inlet and outlet leads has been used here only for descriptive purposes. Naturally, the current is reversed during a full swing of the transformer.

The leads 183 and 185 are configured as shown to behave flexibly during the compression of the ohmic heating coil 34' due to the toroidal field coil 24 centering force.

Since the thickness of the cylinder 210 is not critical for its electrical conduction function this thickness can be used to modulate the stress distribution in windings 182, cylindrical sections 216, and finally in the cylinder 210 itself by its modulus of elasticity which is the same as the windings 182, but about one-half of the modulus of the cylindrical sections 216.

Returning again to FIG. 2, it will be seen that transition coils 124, in conjunction with vertical and poloidal field operation ("hybrid") for the poloidal field coils 32, compensate for the fact that the ohmic heating coil 34 is not an ideal coil of nearly "infinite" length, by diverting the ohmic heating coil flux around the plasma confinement vessel 30, so as not to interfere with the plasma confinement physics and geometry.

There are two tritium breeding and neutron absorbing nuclear blankets. One is the semi-permanent outer main blanket 36 positioned as shown in FIGS. 1 and 2. The other is a removable inner auxiliary blanket 130 as shown in FIG. 2 to be a part of the removable inner portion 14 (there is a removable inner auxiliary blanket 130 portion near the top of the fusion core central portion 14, not shown because in the view of FIG. 2 it is behind the plasma vacuum duct 51). A suitable blanket system is a No External Leak (NOEL) blanket as proposed by Brookhaven National Laboratory, W. Yu, J. Powell, J. Fillo, F. Horn, and H. Mankowitz, "Noel—A No Leak Fusion Blanket Concept," 1977, IEEE, San Francisco, the disclosure which is hereby incorporated by reference. The NOEL blanket takes advantage of the fact that most of the fusion neutron energy is fast neutrons which tend to deposit more of their energy in the interior of a structure than at its periphery. The main blanket system 36 of the present invention is a slightly modified version of the NOEL blanket as shown in the above-referenced paper. A main blanket 36 is confined within a toroidal space interior to the external portion 26 of the toroidal field coils 24, and, further, interior to a generally C-shaped neutron reflector and shield 133, also located in the interior of the external portion 26 of the toroidal field coils 24 and adjacent the inner surface of those coils 24. The reflector/shield 133 is made, e.g., of water-cooled stainless steel, graphite, or beryllium alloy. There is a liner (not shown) surrounding the main blanket 36 adjacent the reflector/shield 133, and separating the main blanket 36 from the interior portion 14 along a generallly cylindrical separation surface 135, between the interior portion 14 and the outer portion 16. The main blanket 36 employs a tritium breeding material, e.g., metallic compounds such as $Li_{17}Pb_{83}$ or LiPb, or fused salts such as FLiBe, which is contained in the central zone of the main blanket 36 in a liquid phase. The main blanket 36 also contains a coolant inlet plenum 137 and a coolant outlet plenum 139 to which are connected a plurality of adjacent looped coolant tubes 136 which together form a torus within the torus of the toroidal field magnets 24, and specifically in the outer portion 26 thereof. The outside of the coolant tubes 136 may have fin plate structures (not shown) to facilitate heat transfer between the coolant passing in the coolant tubes 136 and the blanket material. The coolant tubes 136 carry a liquid or gaseous coolant below the melting point of the blanket material. Most of the fusion neutron energy is absorbed in the interior of the main blanket 36, which renders the interior of the main blanket 36 liquid in phase. The heat is transported by conduction and convection to the outer regions of the main blanket 36 adjacent the cooling coils 136, in which region the blanket material is a frozen, i.e., solid material, and from thence is transmitted to the coolant in the tubes 136. By maintaining the liquid blanket material at a pressure higher than the pressure of the coolant, the blanket material forms a plug should there be any rupture in any of the coolant tubes 136, thereby preventing blanket failure. Leakage of the blanket material through the external frozen blanket boundary is prevented due to the solid phase nature of that boundary.

In addition, the heat of fusion of the main blanket 36 would be very substantial. The main blanket 36 will thus serve as a "thermal flywheel" and smooth the thermal cycling resulting from pulsed operation in the manner of tokamaks. Because phase changes are attended by volume changes as well, a volume compensator 140 is provided within the liquid material of the main blanket 36 and is formed of a hollow baffle which may be connected to an external surge tank (not shown). Also not illustrated is some means for removing a fractional portion of the liquid blanket material in order to pass it through a tritium extraction apparatus, as is known in the art, in order to extract the bred tritium.

The inner auxiliary blankets 130 are provided more for magnet shielding in the region around the joints 54 and 55, than for tritium breeding and power recovery and may be something of a simple single pass type with a baffled interior (not shown). However, breeding material may be passed through the auxiliary blankets 130 in the form of, e.g., $Pb_{83}Li_{17}$. Much of the interior portion of the toroidal field coil turns 28 remain unshielded and, specifically, there is no shielding in this embodiment between the plasma vessel 30 and the vertical span of the inner portion 28, so as not to increase the plasma major radius due to the interposition of shielding. All interior surfaces of the main blanket 36 and auxiliary blanket 130 modules may be coated with a dielectric to reduce MHD drag and associated pumping power. The blanket material in both the inner auxiliary blankets 130 and the outer main blanket 36 will be drained for central portion 14 and main blanket 36 replacement, respectively.

The blanket 36 may have a service life less than the service life of the outer portion 26 of the toroidal field coils, and thus need to be replaced more often. For this reason the access joint 75 is provided between the upper horizontal stretch and the vertical stretch of each coil turn plate 65 within the outer portion 26 of the toroidal field coils 24. The upper horizontal stretch of the reflector/shielding 133 is also detachable from the remainder thereof to enable access to the main blanket 36 to lift it out vertically from the reactor core 12 in conjunction with a replacement of the demountable central portion 14.

It is also to be noted, that the blanket coolant inlet and outlet plenums 137, 139 are connected to coolant inlet and outlet lines 142 and 144 respectively, which also pass through suitably positioned openings in dummy turns 53 for the toroidal field coils 24.

The toroidal field coil 24 is subjected to inplane electromagnetic forces which schematically act as if causing an internal pressure. This pressure results from interaction between the toroidal field coil 24 current and its self-generated toroidal field. Due to the inverse radius dependency of the toroidal magnetic field the pressure is the greatest on the inner field production portion 28 of the coil 24 and then tapers with this same dependency to an appreciably lower value on the outer portion 26. The net effect is that each coil turn 65 experiences a centering force primarily dictated by the strong inward pressure on each inner vertical stretch of the inner portion legs 28. This same portion 28 of the coil is additionally subjected to a strong tension force deriving from the outwardly directed forces on the generally horizontal top and bottom stretches contained principally in the outer portion 26. The outer vertical stretches of the outer portion 26 absorb only a small tension force since the centroid of the integrated horizontal force distribution is much closer to the inner legs 26. The tension in the inner legs 26 is critical since the associated cross-section of each is relatively small, leading to potentially very high tension stress.

In addition to the above-mentioned in-plane loads (on a turn-to-turn basis), the toroidal field coil turns 65 may be subjected to an out-of-plane force directed in one toroidal direction above the central midplane and in the other toroidal direction below the midplane. This creates a moment couple on each turn or an overturning moment. The out-of-plane loads derive from interaction between the toroidal field coil current and an externally generated vertical field deriving from the poloidal field coil 32 system. For the case where the poloidal field coils 32 are located in the bore of the toroidal field coil, negligible field strength is present at the horizontal current carrying stretches (principally in the outer portion 26 of the toroidal field coil 24) and, thus, the resulting overturning moment is of very little consequence. On the other hand, should the poloidal field coils 32 be located outside the toroidal field coil 24, mainly above the top horizontal stretch and below the bottom horizontal stretch of the toroidal field coil 24 inner and outer portions 28, 26, the resulting overturning moment will be sufficiently large to warrant a restraining system whereby either each coil turn 65 is locked to adjacent turns 65 or tied to an external torque-resisting structure.

The toroidal field coil 24 also experiences expansion due to ohmic and radiation heating and swelling due to neutron irradiation.

The toroidal field coil 24 is supported under the centering force by the wedging action between the wedge-shaped coil turns 65. A slightly raised, by about ½ mm, electrically insulating pressure contact surface is associated with each coil turn on each side of primarily the inner legs 28 and also extending somewhat outboard on either side of the top and bottom horizontal stretches of the outer legs 28. Alternatively, if the central core ohmic heating coil 34 is constructed as a multiple ribbon coil 34' (as shown in FIG. 7), this would enable the toroidal field coil turns 65 to react directly against the ohmic heating coil 34' windings and, thus, support both subsystems against each other. In this case, wedging action will not be present since a small electrically insulating lateral gap between coil turns 65 will be provided. The latter approach, of a "bucking" ohmic heating coil 34' provides for greater dimensional control of the toroidal field coil 24 in that it is referenced to the cylindrical bucking surface of the ohmic heating coil 34' which should prove more stable in the neutron radiation environment than, for example, the wedging toroidal field coil turns 65, since the bucking reference surface is further removed from the neutron source.

It is also an important feature of the invention to provide an external tension-suppression system with the primary objective of counteracting the tension in the inner legs 28 of the toroidal field coil 24, and a secondary objective to serve as an external torque-resisting structure if needed.

For an unsupported toroidal field coil 24, the tension in the inner leg portion 28 would scale as the function of one over the coil aspect ratio to the second power. The inner portion 28 of the coil 24 could support itself internally only if the toroidal field coil 24 aspect ratio was about the same as that of the plasma within the plasma confinement vessel 30 (aspect ratio of approximately 2.0). Since the construction of the present invention places the main blanket 36 within the outer toroidal field coil portion 26 and the plasma vessel 30 within the inner toroidal field coil portion 28, external toroidal field coil 24 structural support is required. In addition, structural support helps to relieve tension and expansion stresses to a suitably low level. It is important to maintain low stresses to minimize shear stresses in the joints 54, 55 and to alleviate the synergistically destructive effects of cyclic fatigue, due to tokamak type operation, and neutron irradiation.

The tension supporession system includes the vessel 18 which may be constructed of prestressed or reinforced concrete (e.g., reinforced by tendons 230) and the closure lid 20, as well as the base 154 of the vessel 18. In addition, circumferential bands or tendons 231 surround the vessel 18 in circumferential grooves in the outer wall of the vessel 18, for added support.

The lid 20 is shown in FIG. 2 to be of a structural metal honeycomb 232 containing reinforced concrete within the honeycomb 232 sections, but may also be constructed of prestressed or reinforced concrete. The lid 20 of the embodiment of FIG. 2 has a donut-shaped closure and alignment cap 180 which surrounds and aligns the portion of the central core ohmic heating coil 34 system which extends through the lid 20. The alignment cap 180 also serves as a structural tie between the lid 20 and the central core ohmic heating coil 34 which, in turn, is connected to the inner demountable core toroidal field producing legs 28 from beneath via an annular disc 125 sandwiched between the lower transition coil 124 and its seat at the bottom of the toroidal field coil inner portion 28. The structural tie between the lid 20 and the central core ohmic heating coil 34 via the alignment cap 180 thus provides structural continuity and is employed to lift the demountable core 14 during its replacement operation. The lid 20 then serves as a lift structure providing good shielding against gamma radiation from the neutron irradiated spent core inner portion 14 and the other remaining portions of the machine.

A plurality of penetrations are provided in the lid 20 and it is primarily via these that the apparatus is serviced with coolant, vacuum pumping and electric power. A plurality of hydraulic cylinders 150 are mounted on the lid structure 20. The rams of the hydraulic cylinders 150 expand outwardly to engage bearing plates 152 contained on the interior side wall of the vessel 18, and when extended to contact the bearing plates 152 exert a downward force on the lid 20. This force, in turn, is translated to insulated segmented antifriction (in the radial direction) spacer elements 153 on top of the horizontal outer stretch of the outer portion 26 of the toroidal field coil 24. The device rests on similar spacer elements 155 at bottom contacting the base 154 of the vessel 18. The outer portion 26 of the toroidal field coil 24 is thus compressed between the lid 20 and the base 154. Also, force is separately translated to the interior portion 28 of the toroidal field coil 24 by a pressure-regulated expansion ring 156 or other suitable apparatus for forming an adjustable force coupling. The vertical external force distribution between the outer portion 26 and the inner portion 28 is determined by the flexibility characteristics of the toroidal field coil 24 and the tension suppression system structure and is such that an appreciable force is delivered to the legs of the inner portion 28 of the toroidal field coil 24 to preload that portion into compression to render it nearly stress-free in the energized state of the toroidal field coil 24.

The cylindrical pressure-regulated expansion ring 156 is comprised of an outer plate 158 abutting the lid 20 via an antifriction element, e.g., Lubrite TM shims (not shown), and having a concave bearing surface indentation, and an inner plate 160 of similar construction abutting a segmented toroidal force transfer member 162, having a triangular cross-section. An oval tube 166 extends between and is confined by the concave bearing surface indentations in the outer plate 158 and inner plate 160. The inner portion 28 of toroidal field coil 24 is thus compressed between the lid 20 and a lower triangular circumferentially segmented force transfer member 168 abutting the base 154 of the vessel 18, via antifriction elements (not shown) similar to those described above. It also will be understood that the same restraining effect may be achieved with the pressure-regulated expansion ring providing an adjustable force coupling between the base 154 and the lower generally horizontal stretch of the inner field producing leg portion 28 of the toroidal field coils 24, with either a static coupling above or another adjustable force coupling above, as presently shown in FIG. 2.

Annular pressure regulated expansion rings 169, 170, constructed in a manner similar to that of the pressure regulated expansion ring 156, are provided for adjustable force reaction between the internal side wall of the vessel 18 and the vertically extending span of the external toroidal field coil portion 26.

The reaction force is adjusted by the expansion rings 169 and 170 to compensate for the radially outward magnetic pressure on the vertical stretch of the outer portion 26 of the toroidal field coil 24 so that negligible horizontal force is translated to the inner vertical leg (via top and bottom horizontal stretches of the outer portion 26) which can thus remain moment-free. The force is regulated to a value to accomplish this while the expansion rings 169, 170 also absorb the radially outward-directed displacement due to thermal expansion and swelling of the toroidal field coil 24.

By keying the coil turns 65 via the spacer elements 153 at top to the lid 20 and 155 at bottom to the base 154 and further keying the lid 20 to the cylindrical structure 18, the tension suppression system is made to carry the toroidal field coil 24 overturning moment in shear action and, thus, serves as an external torque-resisting structure, as well.

SUMMARY OF THE SCOPE AND ADVANTAGES OF THE INVENTION

The tokamak fusion reactor core 12 of the present invention employing a water cooled normally conducting toroidal field coil 24 has many advantages over previously suggested tokamak designs because, among other things, the toroidal field coil 24 is divided into two discrete subsystems. These discrete subsystems include a removable central portion 14 which contains the field producing coil legs 28, which generate the required magnetic field, and a relatively permanent surrounding outer portion 16 that includes the return legs 26, which provide the return path for the toroidal magnet 24 current. The relatively permanent surrounding outer portion 16 also contains the main tritium breeding and energy recovery blanket 36. The removable inner portion 14 also includes the vacuum chamber plasma confinement 30, and depending on the additional design and physics criteria, may include as well the poloidal field coils 32, and the equipment associated with generating sufficient temperature for ignition and burn in the plasma, e.g., an ohmic heating coil or rf heating antennae. The applicants believe that the current state of the art best employs the poloidal field coils 32 and an ohmic heating coil 34 within the removable central portion, but neither of such placements is essential to the basic design of the present invention, and poloidal field coil designs presently available or to be developed may enable placement outside the removable central portion, and plasma heating may also prove feasible from without the removable central portion, or by other than ohmic heating.

The inner core portion 14 is removable and replaceable once every approximately two to four months, which is approximately the period of time that first wall 41 materials can be expected to last in high neutron radiation exposure fluxes. The combined effects of neutron radiation and cyclic fatigue on the internal portion 28 of the toroidal field coils 24, may prove to be more limiting than the first wall 41 life. However, the expected life of the demountable core section 14 is still expected to be approximately two to four months. Of course, this may be lengthened somewhat by the development of new materials and fabrication capabilities, however, the demountable core 14 life will still be significantly shorter than that of the relatively permanent outer portion 26 of the toroidal field coil 24, which is expected to have a lifetime on the order of ten to twenty years. It is also significantly shorter than the expected life of the main blanket 36, i.e., on the order of several years. With the removal and replacement time permitted to be as long as one demountable tokamak fusion core 14 lifetime, which appears to be achievable, a plant having two tokamaks of the design of the present invention would be able theoretically to be in continuous operation. For plants with two operating demountable tokamak fusion core type reactors of the present invention and one on standby for removal and replacement of the demountable tokamak fusion core 14, the plant capacity factor and plant availability will be even further enhanced.

The applicants believe that the tokamak fusion reactor core 12 of the present invention employing the demountable central portion 14 presents a commercially viable and more attractive alternative than both superconducting tokamak reactor concepts and other normally conducting tokamak concepts previously proposed. Superconducting tokamaks are expected to be large, low power density devices and have to be regarded as lasting for 30 to 40 years without replacement. Normal conducting tokamaks are viewed as either experimental (LITE and IGNITOR) or "commercial" (RIGGATRON ™), but have features which make commercial utilization impractical and/or too expensive as a source of pure fusion electrical power. The demountable tokamak fusion core 14 of the present invention is a "commercial" embodiment of a tokamak resulting from information available from successful tokamak ignition and burn experiments. The RIGGATRON ™ is also claimed to be a commercially useful tokamak; however, it is conceived to be a completely replaceable tokamak with commercially questionable features, e.g., a blanket located external to the toroidal field coil in comparison to the main blanket 36 of the present invention.

Parametric systems analysis conducted by the applicants has indicated that an electric power plant for the generation of approximately 600 megawatts can be constructed with a recirculating power fraction of approximately 0.4 and a first wall 41 heat flux of approximately 2.0 kW per square centimeter (one operating module plant). Using standard cost accounts and utility accounting procedures (Battelle Report No. PNL-2648) the levelized cost of electric power from such a plant is computed to be on the order of 40 mills per kilowatt hour in current dollars, and thus is very competitive with existing fossil and fission electric power generation. The analysis was based upon typical technical and operating performance of a demountable tokamak fusion core plant employing the present invention with a major radius of approximately 1.2 meters, an aspect ratio of approximately 2.1 and a plasma elongation of approximately 1.6, and employing a toroidal magnet burn field of approximately 9.3 telsa.

The design restraint for the maximum diameter for the demountable portion 14 of approximately five-seven meters will greatly facilitate both removal and replacement of the demountable portion 14 as well as shipment of that demountable portion 14 by rail or barge from a remote fabrication site to the reactor site. At the same time, the overall construction of the tokamak fusion core 12 of the present invention does not suffer from the design constraints which would result from the design for a fusion core in which the entire tokamak is limited to five-seven meters in diameter to facilitate rail or barge transportation and/or the entire core is designed to achieve an operating life of acceptable length on the order of several years.

Therefore it appears that the tokamak fusion core 12 according to the present invention allows for realistic geometries and an acceptable operating lifetime for the successful operation of a normally conducting tokamak achieving both ignition and burn in the plasma. The length of the burn also will be much longer than the time to achieve ignition to allow for sufficient recirculated energy to operate the toroidal field coil and the plasma heating system, e.g., an ohmic heating coil 34.

Moreover, the design of the tokamak fusion power core 12 of the present invention, with the demountable central portion 14 results in a better and more economical design for tokamak fusion test reactors to examine plasma physics and geometries and to achieve experimental ignition and burn in the plasma. In such an experimental reactor, of course, certain features needed for sustained and economical operation of a commercial embodiment may be omitted. For example, the main blanketing system may be eliminated because fuel and magnet electrical power can be supplied independently of the experimental core operation, as tritium breeding and recirculating power factors are not of concern in demonstrating ignition and burn capability.

The foregoing description of the invention has been directed to a particular preferred embodiment in accordance with requirements of the patent statutes and for purposes of explanation and illustration. It will be apparent, however, to those skilled in this art that many modifications and changes in both the apparatus and method may be made without departing from the scope and spirit of the invention. For example, in FIG. 2, the various penetrations through one of the dummy coil windings are shown, for purposes of illustration, to be through a single dummy winding in the plane of the paper. It will be understood, that the penetrations may be disbursed through a multiplicity of dummy windings about the circumference of the tokamak. It will also be understood that there are other possible constructions for such components as the plasma confinement vessel 30, the plasma facing surface of the confinement vessel 41, the blanket structure 36, and ohmic heating coil 34, which also may be employed in the present invention without departing from the scope and nature of the invention, particularly as continued research and development arrives at improved designs for such component systems and the elements thereof. In addition, the vessel 18 may be constructed of material other than concrete, with concrete having been selected in this design because of cost, ease of fabrication and its additional contribution as a primary biological shield around the fusion core 12. In addition, other means known in the art may be employed for the application of the controlled external pressure action upon the toroidal field coils provided by the pressure-regulated expansion rings described in the specification. Furthermore, the hydraulic cylinders 150 for applying downward pressure on the lid 20 could be replaced by other expandable force applying means as is known in the art, for example, hydraulically operated or electrically operated threaded expansion members. Other fusion fuels and other blanket materials also may prove to be useful in the present invention. It will be further apparent that the invention may be utilized with these and other suitable modifications within the state of the art which will be apparent to those skilled in the art. It is the applicants' intention in the following claims to cover all such equivalent modifications and variations as fall within the true spirit and scope of the invention.

What is claimed is:

1. In a tokamak fusion reactor, the combination which comprises:
   a toroidal magnetic field coil having a plurality of inner field producing legs for generating a toroidal magnetic confinement field and outer current return legs for providing a current return path for current flow through the inner legs;
   a plasma containment vessel disposed within a toroidal magnetic field coil adjacent the inner field producing legs;
   a main blanket assembly for recovery of fusion power and/or generation of fusion fuel disposed within the toroidal magnetic field coil adjacent the outer current return legs;
   a poloidal field coil for heating a plasma within the containment vessel through ohmic power dissipation, disposed adjacent to the inner field producing legs of the toroidal magnetic field coil;
an inner auxiliary blanket assembly extending around a portion of the containment vessel; and
means for supporting and detachably joining the inner field producing legs to the outer current return legs of the toroidal magnetic field coil so that the entire central portion of the reactor including the inner field producing legs of the toroidal magnetic field coil, the plasma containment vessel, the inner auxiliary blanket assembly, and the poloidal field coil may be demounted and replaced as a unit while leaving in place the current return legs of the toroidal magnetic field coil and the main blanket.

2. The apparatus of claim 1, wherein the means for joining the inner field producing legs to the current return legs of the magnetic field coil comprise
a pair of joints associated with each turn.

3. The apparatus of claim 2 wherein the joints at the boundary of the legs of the toroidal field coils facing a removal opening for the central portion form a first boundary surface which has a diameter greater than a second boundary surface of the joints at the boundaries of the legs of the toroidal field coils disposed away from the removal opening, and the additional components of the central portion are contained within a maximum diameter less than or equal to the diameter of the first boundary surface.

4. The apparatus of claim 2, further comprising:
a fusion core confinement system having:
a vessel formed of a generally U-shaped solid of revolution with the contents of the demountable central portion supported by the interior floor of the U-shaped solid of revolution;
a confinement lid disposed within the interior of the U-shaped solid of revolution and above the tokamak; and
an adjustable force coupling system, having an adjustable force coupling element with the coupling system disposed to cooperate with the confinement lid and the vessel floor to exert a tension suppressing force on the inner field producing legs of the tokamak toroidal field coil.

5. The apparatus of claim 4, further comprising:
a demountable central portion of the containment lid disposed above the demountable central portion of the fusion core.

6. The apparatus of claim 5, further comprising:
a plurality of expandable coupling members disposed between the confinement lid and the vessel and arranged to exert a force upon the confinement lid in the direction of the tokamak, when expanded.

7. The apparatus of claim 5, further comprising:
at least one annular resilient coupling element disposed between the interior vertical walls of the vessel and the current return legs of the toroidal field coil.

8. The apparatus of claim 7, further comprising:
a plurality of expandable coupling members disposed between the confinement lid and the vessel and arranged to exert a force upon the confinement lid in the direction of the tokamak, when expanded.

9. The apparatus of claim 4, further comprising:
at least one annular resilient coupling element disposed between the interior vertical walls of the vessel and the current return legs of the toroidal field coil.

10. The apparatus of claim 9, further comprising:
a plurality of expandable coupling members disposed between the confinement lid and the vessel and arranged to exert a force upon the confinement lid in the direction of the tokamak, when expanded.

11. The apparatus of claim 4 further comprising:
a plurality of expandable coupling members disposed between the confinement lid and the vessel and arranged to exert a force upon the confinement lid in the direction of the tokamak, when expanded.

12. The apparatus of claim 4 wherein the adjustable force coupling element is formed of:
a ring-shaped first mounting plate connected to the lid and having an exposed bearing surface indentation;
a ring-shaped second mounting plate connected to the inner field producing legs of the tokamak toroidal field coil and having an exposed surface indentation; and
a hollow tubular member disposed between the first and second mounting plates and confined by the respective bearing surface indentation of each, and within which is contained a pressurized fluid.

13. The apparatus of claim 1 further comprising:
a fusion core confinement system having:
a vessel formed of a generally U-shaped solid of revolution with the contents of the demountable central portion supported by the interior floor of the U-shaped solid of revolution;
a confinement lid disposed within the interior of the U-shaped solid of revolution and above the tokamak; and
an adjustable force coupling system, having an adjustable force coupling element with the coupling system disposed to cooperate with the confinement lid and the vessel floor to exert a tension suppressing force on the inner field producing legs of the tokamak toroidal field coil.

14. The apparatus of claim 13 further comprising:
a demountable central portion of the containment lid disposed above the demountable central portion of the fusion core.

15. The apparatus of claim 14, wherein:
the means for joining the inner field producing legs to the current return legs of the magnetic field coil comprises a pair of joints associated with each turn; and
at least one annular resilient coupling element disposed between the interior vertical walls of the vessel and the outer portion of the toroidal field coil turns of the tokamak.

16. The apparatus of claim 15, further comprising:
a plurality of expandable coupling members disposed between the confinement lid and the vessel and arranged to exert a force upon the confinement lid in the direction of the tokamak, when expanded.

17. The apparatus of claim 14 further comprising:
a plurality of expandable coupling members disposed between the confinement lid and the vessel and arranged to exert a force upon the confinement lid in the direction of the tokamak, when expanded.

18. The apparatus of claim 13, wherein:
the means for joining the inner field producing legs to the current return legs of the magnetic field coil comprises a pair of joints associated with each turn; and
at least one annular resilient coupling element disposed between the interior vertical walls of the vessel and the outer portion of the toroidal field coil turns of the tokamak.

19. The apparatus of claim 18, further comprising:
a plurality of expandable coupling members disposed between the confinement lid and the vessel and arranged to exert a force upon the confinement lid in the direction of the tokamak, when expanded.

20. The apparatus of claim 18, 9, 15 or 7 wherein the at least one annular adjustable force coupling element is formed of:
   a first annular mounting plate connected to the interior of the vessel side wall and having an exposed bearing surface indentation;
   a second annular mounting plate connected to the vertical span of the current return legs of the tokamak toroidal field coil and having an exposed bearing surface indentation; and
   a hollow tubular member disposed between the first and second annular mounting plates and confined by the respective bearing surface indentation of each and within which is contained a pressurized fluid.

21. The apparatus of claims 18, 9, 15 or 7 wherein the at least one annular resilient coupling element is two annular resilient coupling elements.

22. The apparatus of claims 18, 9, 15 or 7 wherein the at least one annular resilient coupling element is two annular resilient coupling elements each comprising:
   a first annular mounting plate connected to the interior of the vessel side wall and having an exposed bearing surface indentation;
   a second annular mounting plate connected to the vertical span of the current return legs of the tokamak toroidal field coil and having an exposed bearing surface indentation; and
   a hollow tubular member disposed between the first and second annular mounting plates and confined by the respective bearing surface indentation of each and within which is contained a pressurized fluid.

23. The apparatus of claim 13, further comprising:
a plurality of expandable coupling members disposed between the confinement lid and the vessel and arranged to exert a force upon the confinement lid in the direction of the tokamak, when expanded.

24. The apparatus of claims 23, 11, 17, 6, 19, 10, 16 or 8 wherein the expandable coupling members are formed of hydraulic cylinders.

25. The apparatus of claim 13 wherein the adjustable force coupling element is formed of:
   a ring-shaped first mounting plate connected to the lid and having an exposed bearing surface indentation;
   a ring-shaped second mounting plate connected to the inner field producing legs of the tokamak toroidal field coil and having an exposed surface indentation; and
   a hollow tubular member disposed between the first and second mounting plates and confined by the respective bearing surface indentation of each, and within which is contained a pressurized fluid.

26. The apparatus of claims 25 and 12 wherein the first and second ring-shaped mounting plates are segmented.

* * * * *